(12) United States Patent
Namnabat et al.

(10) Patent No.: US 11,163,113 B2
(45) Date of Patent: Nov. 2, 2021

(54) ATHERMAL SILICON OPTICAL ADD-DROP MULTIPLEXERS BASED ON THERMO-OPTIC COEFFICIENT TUNING OF SOL-GEL MATERIAL

(71) Applicant: Arizona Board of Regents on Behalf of the University of Arizona, Tucson, AZ (US)

(72) Inventors: Soha Namnabat, Tucson, AZ (US); Robert A. Norwood, Tucson, AZ (US); Kyung-Jo Kim, Tucson, AZ (US); Roland Himmelhuber, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/639,824

(22) PCT Filed: Aug. 14, 2018

(86) PCT No.: PCT/US2018/046580
§ 371 (c)(1),
(2) Date: Feb. 18, 2020

(87) PCT Pub. No.: WO2019/036395
PCT Pub. Date: Feb. 21, 2019

(65) Prior Publication Data
US 2020/0264370 A1    Aug. 20, 2020

Related U.S. Application Data

(60) Provisional application No. 62/547,158, filed on Aug. 18, 2017.

(51) Int. Cl.
*G02B 6/122*    (2006.01)
*C08K 5/56*    (2006.01)
(Continued)

(52) U.S. Cl.
CPC .............. *G02B 6/1221* (2013.01); *C08K 5/56* (2013.01); *C08L 83/04* (2013.01); *G02B 6/1203* (2013.01);
(Continued)

(58) Field of Classification Search
None
See application file for complete search history.

(56) References Cited

U.S. PATENT DOCUMENTS

2001/0016093 A1    8/2001  Dawes
2009/0052856 A1    2/2009  Bae
(Continued)

OTHER PUBLICATIONS

Namnabat, Set al. Athermal silicon optical add-drop multiplexers based on thermo-optic coefficient tuning of. Optic Express vol. 25, No. 18. Aug. 25, 2017.

*Primary Examiner* — Chad H Smith
(74) *Attorney, Agent, or Firm* — Stuart H. Mayer; Mayer & Williams PC (57) ABSTRACT

An athermal optical waveguide structure such as an optical add drop multiplexer (OADM) or the like is fabricated by a method that includes forming a lower cladding layer on a substrate. A waveguiding core layer is formed on the lower cladding layer. An upper cladding layer is formed on the waveguiding core layer and the lower cladding layer a sol-gel material. The sol-gel material includes an organically modified siloxane and a metal oxide. A thermo-optic coefficient of the sol-gel material is adjusted by curing the sol-gel material for a selected duration of time at a selected temperature such that the thermo-optic coefficient of the sol-gel material compensates for a thermo-optic coefficient of at least the waveguiding core layer such that an effective thermo-optic coefficient of the optical waveguide structure at a specified optical wavelength and over a specified temperature range is reduced.

23 Claims, 10 Drawing Sheets

(51) Int. Cl.
*C08L 83/04* (2006.01)
*G02B 6/12* (2006.01)
*G02B 6/293* (2006.01)

(52) U.S. Cl.
CPC ..... *G02B 6/12028* (2013.01); *G02B 6/29338* (2013.01); *G02B 2207/109* (2013.01)

(56) References Cited

U.S. PATENT DOCUMENTS

| | | | |
|---|---|---|---|
| 2010/0014800 A1* | 1/2010 | Derose | G02F 1/065 385/2 |
| 2016/0153888 A1 | 6/2016 | Hook | |
| 2016/0349547 A1 | 12/2016 | Chen et al. | |
| 2020/0132931 A1* | 4/2020 | Fard | G02B 6/1223 |

* cited by examiner

SiO₂ TOP CLADDING ETCHING

FIG. 4B

SOL-GEL MATERIAL DEPOSITION

ATHERMAL SILICON OPTICAL ADD-DROP MULTIPLEXERS BASED ON THERMO-OPTIC COEFFICIENT TUNING OF SOL-GEL MATERIAL

GOVERNMENT FUNDING

This invention was made with government support under Grant No. 0812072, awarded by NSF. The government has certain rights in the invention.

BACKGROUND

The emergence of social media, video streaming, online gaming, and lately the Internet of things, has led to a significant increase in demand for data transfer and file sharing. As a result of this demand, datacenters and high performance computing (HPC) have gained a lot of attention for enhancing cloud computing and facilitating these high data demands. However, legacy datacenter and HPC architectures are struggling to keep up because of thermal management challenges and limitations from electrical interconnects.

Electrical interconnects have turned into a bottleneck to more advanced integration due to their high power dissipation and poor performance in denser interconnects. On the other hand, photonic integrated circuits and interconnects have rapidly advanced and are expected to eventually replace electrical interconnects in many applications (chip-to-chip, on-chip, on-board, rack-to-rack, etc.). The transition to photonic devices would provide increased functionality, reliability, low cost and compact size, all of which are attractive for optical communications and bio-sensing, among other areas. Furthermore, they support higher bandwidth, denser interconnects, with higher efficiency in addition to reduced cross talk, latency, and specifically power consumption. In particular, the silicon photonics platform is becoming the preferred technology for photonic integrated circuits, due to its high index contrast, low optical loss in the major telecommunications optical windows, and established CMOS fabrication technology. However, silicon's large thermo-optic coefficient ($1.8 \times 10^{-4}/°$ C.), can limit the application of these devices in situations where large temperature changes are experienced. This is especially a problem for WDM devices and narrowband optical filters where the wavelength shifts by an amount of 50-100 pm/° C.

There have been a number of efforts to achieve temperature independent silicon photonic devices by using both active and passive thermal compensation methods. The active approach comprises the use of external—heaters or thermo-electric coolers—or integrated heaters and various monitoring mechanisms connected to feedback systems. In addition to simple devices, e.g. ring resonators and Mach-Zehnder interferometers (MZI), many have demonstrated (de)multiplexers and switches with heaters. Nevertheless, the extra power consumption and the required electronic interconnects for feedback systems eventually limit integration density, scalability and their size. Furthermore, the use of any external heating means or feedback circuit further increases the power consumption, which can be a non-starter for data center and HPC applications.

In passive athermal approaches, the main idea is to minimize the changes in optical path length difference induced by temperature variations. In Si photonic devices this can be done either by special MZI or microring assisted MZI designs, or through utilizing a hybrid material approach by incorporating negative thermo-optic coefficient (TOC) materials as cladding layers. In the latter, the first athermal silica photonic devices were demonstrated using polymers in the O and C band. This hybrid polymer/silica approach inspired others to extend this work to silicon photonics platform. Many have used polymer claddings with silicon and amorphous silicon as the core material in a variety of waveguide geometries (channel, slot, ridge, and etc.). They successfully have shown the possibility for achieving athermal ring resonators within 20-70° C. The disadvantage of using polymers is that they can only reduce thermal sensitivity for waveguides with a narrowed width. Moreover, they have fixed TOCs (for a given polymer) which may limit material selection for specific waveguide geometries. Furthermore, polymers frequently have issues such as thermal stability, chemical stability, photo-degradation, and mechanical integrity.

Titania (titanium dioxide, $TiO_2$) has been demonstrated as an alternative cladding material to achieve athermal ring resonators. Athermality for these rings were achieved over a very limited temperature range, 6 pm/° C. for 20° C. at 1310 nm and 1.7 pm/° C. for 7° C. at 1550 nm. The tight tolerance in cladding thickness variation which is needed to reach athermal conditions limits this strategy. In addition, large waveguide mode asymmetry, relatively high loss of titania, and high cost arising from vacuum deposition are potential drawbacks to this approach.

SUMMARY

In one aspect, an athermal multichannel optical add-drop multiplexer (OADM) device is described herein which is based on silicon mirroring resonators. Reduction in temperature dependent wavelength shifts were established using a sol-gel derived inorganic-organic hybrid material as the cladding. In one particular embodiment, the sol-gel that is used is composed of 95% to 5% mole ratio of methacryloxypropyltrimethoxysilane (MAPTMS) to zirconium(IV)-n-propoxide (ZPO).

Moreover, the effects of sol-gel material's processing conditions have been examined, thereby enabling control of the TOC of sol-gel material to reduce the OADM ring resonator's thermal wavelength shifts. This analysis can provide the route to achieve athermal conditions for various waveguide structures without greatly altering the cladding material. For instance, by changing the curing condition of the sol-gel, thermal shifts as low as −6 pm/° C. for rings as wide as 325 nm and 310 nm wide in TE polarization have been achieved. Although these rings were ideally designed for TE operation, significant thermal shift reductions in TM have been obtained, which were less than 1 pm/° C. from 5° C. to 90° C.

Based on this examination of sol-gel, in another aspect a method is provided of forming an optical waveguide structure. In accordance with the method, a lower cladding layer is formed on a substrate. A waveguiding core layer is formed on the lower cladding layer. An upper cladding layer of sol-gel material is applied on the waveguiding core layer and the lower cladding layer. The sol-gel material includes an organically modified siloxane and a metal oxide. A thermo-optic coefficient of the sol-gel material is adjusted by curing the sol-gel material for a selected duration of time at a selected temperature such that the thermo-optic coefficient of the sol-gel material compensates for a thermo-optic coefficient of at least the waveguiding core layer such that an effective thermo-optic coefficient of the optical waveguide structure at a specified optical wavelength and over a specified temperature range is reduced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DETAILED DESCRIPTION

Athermal Theory

The resonant wavelength shift of a microring resonator due to temperature change is given by:

$$\frac{d\lambda}{dT} = \frac{\lambda}{n_g}\left(n_{eff}\alpha_{Si} + \frac{\partial n_{eff}}{\partial T}\right) \quad (1)$$

where $\lambda$ is the resonance wavelength and $n_{eff}$ is the effective index of the ring waveguide. $\alpha_{Si}$ and $n_g$ are the linear thermal expansion coefficient for silicon ($\alpha_{Si}=1.8\times10^{-6}/°$ C.) and the waveguide's group index, respectively where the latter accounts for chromatic dispersion. Athermality is achieved when $$\frac{\partial n_{reff}}{\partial T} = -n_{eff}\alpha_{Si}, \text{ thus } \frac{\partial n_{eff}}{\partial T}$$

needs to be negative; this is in contrast to a number of previous reports that have ignored the effects of thermal expansion. A simple calculation shows that thermal expansion induces an approximately 5 pm/° C. wavelength shift at 1550 nm, which is significant if full athermality is required.

Figure 1:
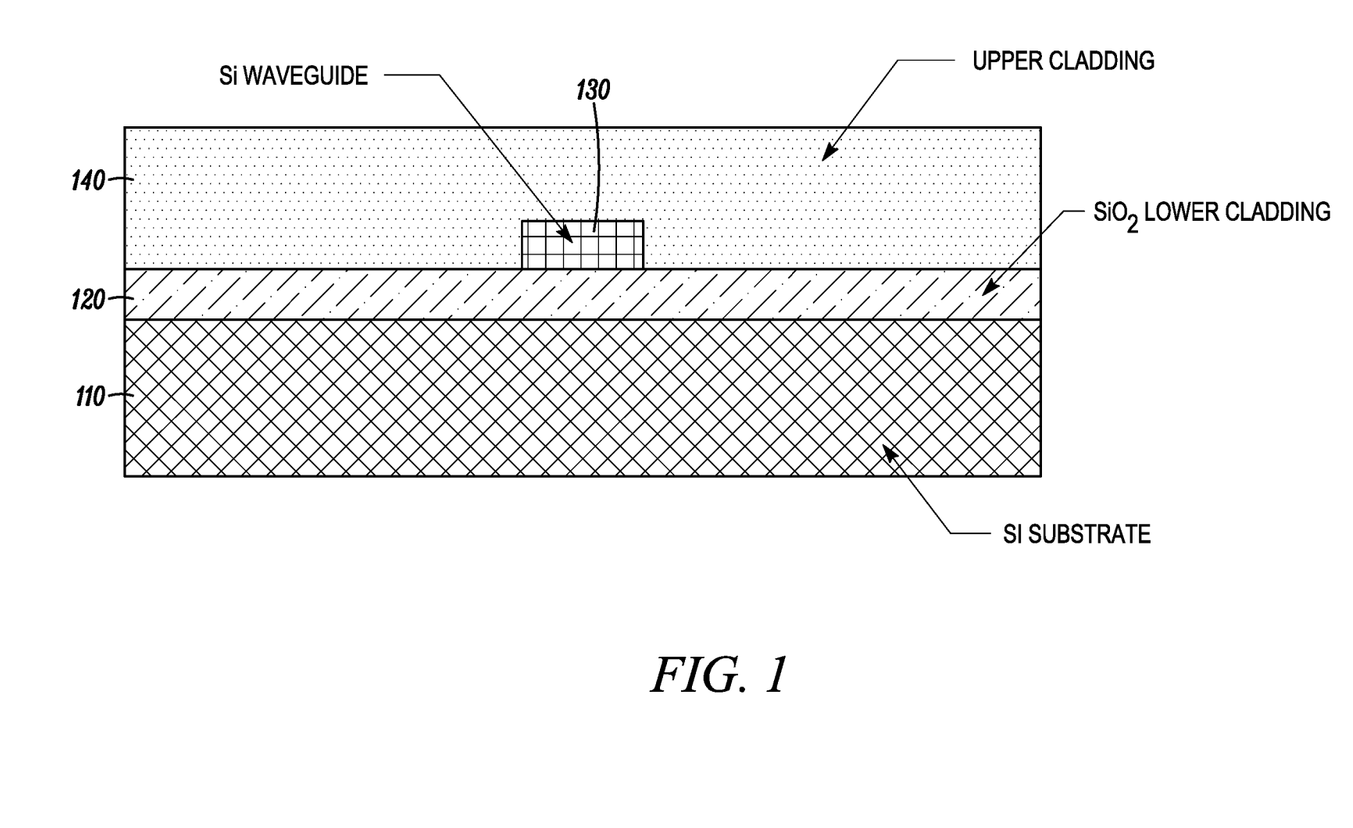
FIG. 1 shows a cross-sectional view of one example of an optical waveguide that may be used to form a microring resonator or other optical waveguide circuit.

FIG. 1 shows a cross-sectional view of one example of an optical waveguide that may be used, for instance, to form a microring resonator or other optical waveguide circuit. The waveguide 100 includes an Si substrate 110 on which an $SiO_2$ lower cladding layer 120 is formed. An Si waveguide core 130 is located on the $SiO_2$ lower cladding layer 120. An upper cladding layer 140, which may be formed from a material different from the $SiO_2$ lower cladding layer 120, is located on the Si waveguide core 130 and the $SiO_2$ lower cladding layer 120.

The effective TOC of the waveguide depends on the refractive index change of the core and the cladding due to the temperature change. For an asymmetric channel waveguide with different upper and lower cladding materials such as shown in FIG. 1, the effective TOC of the waveguide can be expressed as $$\frac{\partial n_{eff}}{\partial T} \approx \Gamma_{clad}\frac{\partial n_{clad}}{\partial T} + \Gamma_{Si}\frac{\partial n_{Si}}{\partial T} + \Gamma_{SiO_2}\frac{\partial n_{SiO_2}}{\partial T} \quad (2)$$

where $$\frac{\partial n_{eff}}{\partial T}$$

is the effective TOC of the waveguide at a given wavelength, while $$\frac{\partial n_{clad}}{\partial T}, \frac{\partial n_{Si}}{\partial T}, \frac{\partial n_{SiO_2}}{\partial T}$$

represent the TOCs of the upper cladding, silicon core, and silica lower cladding, respectively. $\Gamma_{clad}$, $\Gamma_{Si}$, and $\Gamma_{SiO_2}$ in Equ. (2) are the confinement factors for the upper cladding, silicon core and silica lower cladding, respectively. Silica and silicon have positive TOCs of $1\times10^{-5}/°$ C. and $1.8\times10^{-4}/°$ C. respectively. Therefore, a material with a negative TOC is needed to achieve athermal operation.

Suitable Thermo-Optic Materials

The thermo-optic coefficient of dielectric materials is generally determined from a balance of the electronic polarizability and the thermal expansion coefficient (CTE) of the materials. Inorganic-organic hybrid materials prepared through sol-gel processing are another class of materials that can address this problem. Such materials have high CTEs with low polarizabilities due to their organic functional groups. This makes them good candidates for athermal applications, since they possess a wide range of negative TOCs (from $-0.9 \times 10^{-4}/°$ C. up to $-3 \times 10^{-4}/°$ C.) with low optical losses and tunable refractive indices. Furthermore, their organic-inorganic hybrid nature enables one to adjust their optical and mechanical properties from glassy to polymeric, providing an additional degree of freedom in the waveguide design, which is often limited by material properties. Another benefit of sol-gel material is the ease of deposition through spin coating that provides a low-cost solution.

As previously mentioned, polymers are suitable candidates to be applied as waveguide claddings. However, selecting a polymer with a suitable refractive index and TOC is not trivial since a particular combination of parameter values is needed for each waveguide geometry. On the other hand, it is possible to control the TOC of sol-gel materials by changing and controlling the degree of polymerization, organic modifier, hetero-metallic oxide network, or inorganic condensation degree. Once the material composition is chosen and synthesized, another means to further raise the magnitude of the TOC is either through an increase of polymerization or an increase in inorganic condensation. This can be done after the material has been deposited on the chip since the degree of crosslinking in a sol-gel material increases with longer curing time.

In some embodiments the sol-gel material that is employed may be an organically modified siloxane and a metal oxide. For instance, the organically modified siloxane may be MAPTMS and the metal oxide may include zirconium propoxide. Alternatively, the metal oxide may be titanium propoxide or iron propoxide. Of course, other suitable sol-gel materials may also be employed. For purposes of illustration, the following discussion will describe devices that are formed using a sol-gel that is composed of a 95% to 5% mole ratio of methacryloxypropyltrimethoxysilane (MAPTMS) to zirconium(IV)-n-propoxide (ZPO), which will from time to time hereinafter be referred to as a 95/5 sol-gel.

OADM Design

A wide variety of different athermal optical devices may be fabricated using the techniques described herein, ranging from individual waveguides to more complex optical waveguide circuits. Such optical waveguide circuits may define, without limitation, ring resonators, Mach-Zehnder interferometers and arrayed waveguide gratings. For purposes of illustration, the following discussion will describe an athermal optical add-drop multiplexer (OADM) that is formed from microring resonators.

Figure 2A:
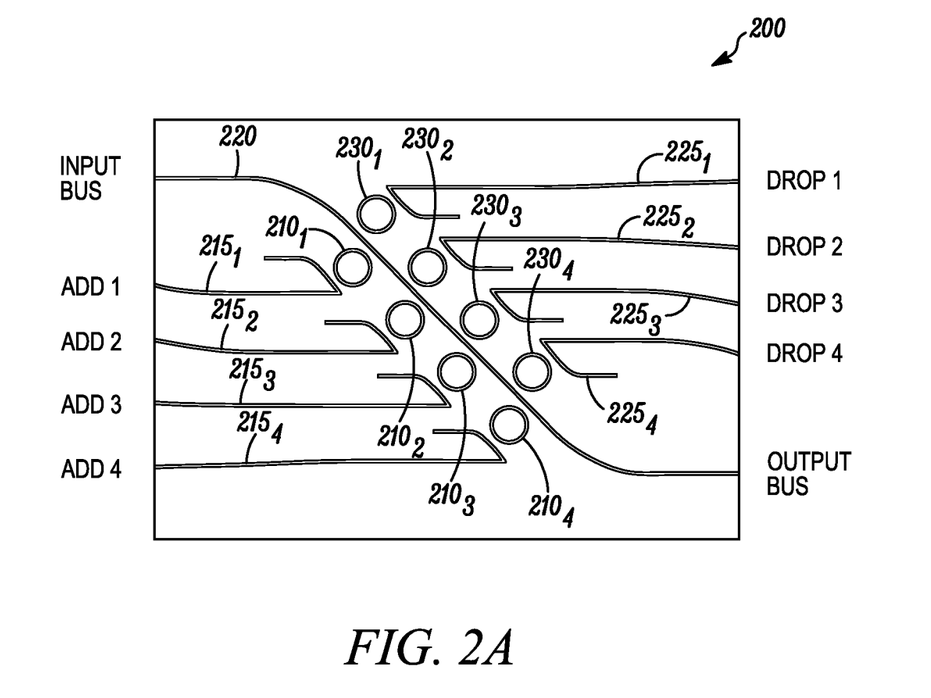
FIG. 2(a) shows one example of an optical add drop multiplexer (OADM) that uses microrings as resonators.
Figure 2B:
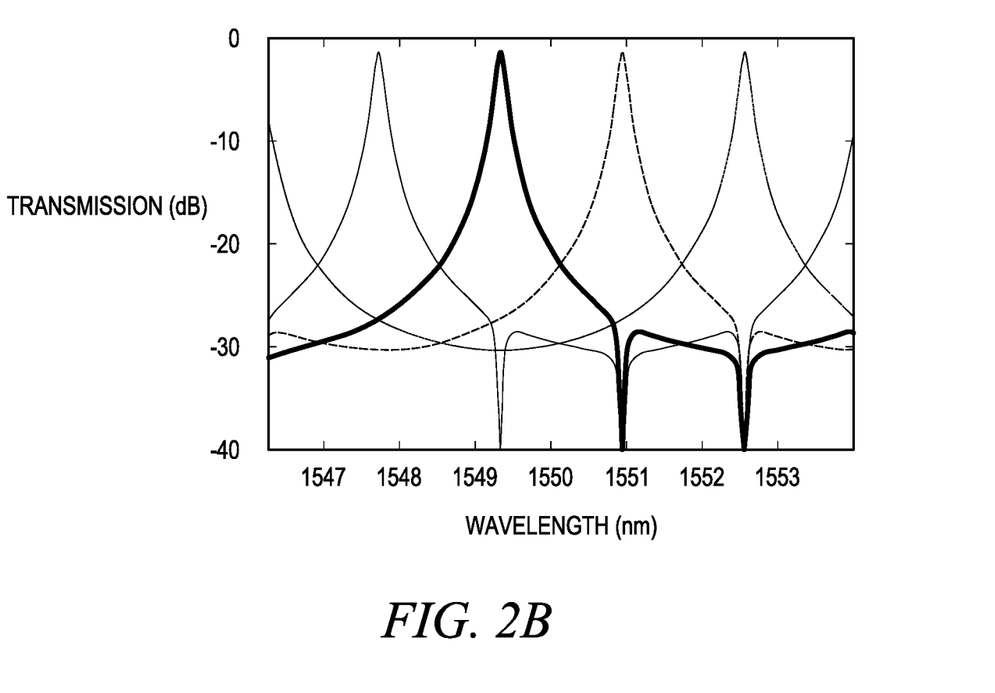
FIG. 2(b) shows the simulated filter response of the OADM shown in FIG. 2(a).

FIG. 2(a) shows one example of an OADM that uses microrings as resonators. The OADM 200 includes a series of add waveguides $215_1$, $215_2$, $215_3$ and $215_4$ that are optically coupled to an input/output waveguide bus 220 by respective microrings $210_1$, $210_2$, $210_3$ and $210_4$. Likewise, the OADM 200 also includes a series of drop waveguides $225_1$, $225_2$, $225_3$ and $225_4$ that are optically coupled to the input/output waveguide bus 220 by respective microrings $230_1$, $230_2$, $230_3$ and $240_4$. The design goal of the illustrative OADM was to add and drop wavelengths with 200 GHz channel spacing on the ITU grid. Each ring was designed in order to provide an 800 GHz free spectral range (FSR) as shown in FIG. 2(b). A number of OADMs were designed with a variety of ring widths and gaps to study the effect of the width on the temperature dependence of the resonance wavelength. The straight input waveguide 220 is 450 nm wide and tapers down to the ring width at the coupling point with widths of 300 nm, 310 nm, and 325 nm. The bus and drop waveguide coupling were symmetric and equal for all rings within a device, though these gaps also varied from 280 nm to 500 nm with 20 nm increments. The rings were designed to have a resonance at 1.5501 µm, 1.5505 µm, 1.5509 µm, and 1.5513 µm respectively. Thus, the diameters were determined according to the desired ring waveguide width, their effective indices and FSR. Finally, the add-drop ports were all separated by 127 µm to allow convenient optical fiber connections to fiber arrays.

Simulation

As it is possible to tune the optical properties of sol-gel materials, it is important to study the parameter space of the ring waveguide geometry (i.e., width and thickness) and the TOCs of sol-gel materials that are required to achieve athermal conditions. The effective index and effective thermo-optic coefficient of the eigenmode was calculated with a commercial mode solver, Fimmwave (Photon Design Ltd.) from 0° C. to 100° C. These values were then used to calculate the temperature dependent resonant wavelength shifts for ring resonators through Equation 1. Silicon-on-insulator (SOI) platform waveguides are mainly used and designed to operate in TE polarization.

Thus, waveguide widths ranging from 280 nm to 500 nm and thicknesses ranging from 220 nm to 260 nm for 1550 nm wavelength with TE polarization have been examined. The cross-section of the simulated channel waveguide illustrated in FIG. 1, is located between the silica lower cladding and silica/sol-gel upper cladding. The corresponding refractive index and TOC values used for 95/5 sol-gel—cured at 150° C. at 12 hours—in the simulation were 1.485 and $-1.52 \times 10^{-4}/°$ C., which were measured with a Metricon (M2010) prism coupler.

Figure 3A:
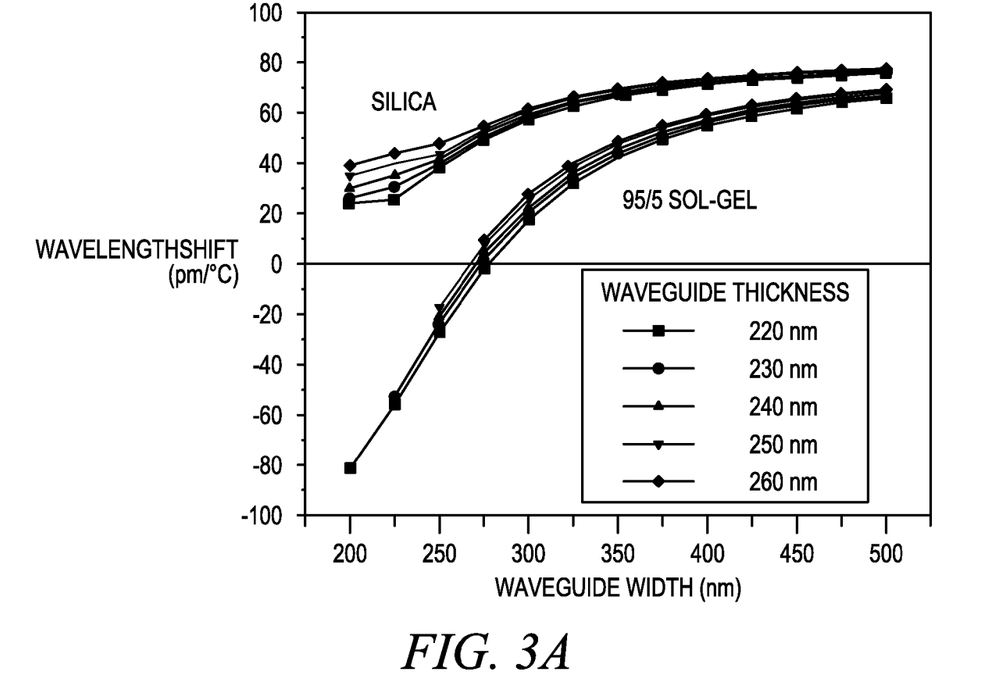
FIG. 3(a) shows simulation results for designing thermal wavelength shifts for silicon waveguides with silica and 95/5 sol-gel cladding at TE polarization.

The dependence of the thermally induced resonance wavelength shifts for silica and 95/5 sol-gel cladding with respect to waveguide geometry are shown in FIG. 3(a). Regardless of the cladding material, the thermal dependence decreases as the waveguide ring width is reduced.

Waveguides with silica cladding show positive thermal wavelength shifts that decrease down to 25 pm/° C.

Alternatively, with the 95/5 sol-gel cladding the thermal wavelength shift changes from 75 pm/° C. down to −80 pm/° C. as the ring's waveguide width is narrowed. The thermal wavelength shift passes the zero line, which shows that there is an optimal waveguide width that is considered athermal. On the other hand, the temperature dependence is more tolerant to waveguide thickness changes, a consideration which only becomes critical for achieving very high athermality.

Figure 3B:
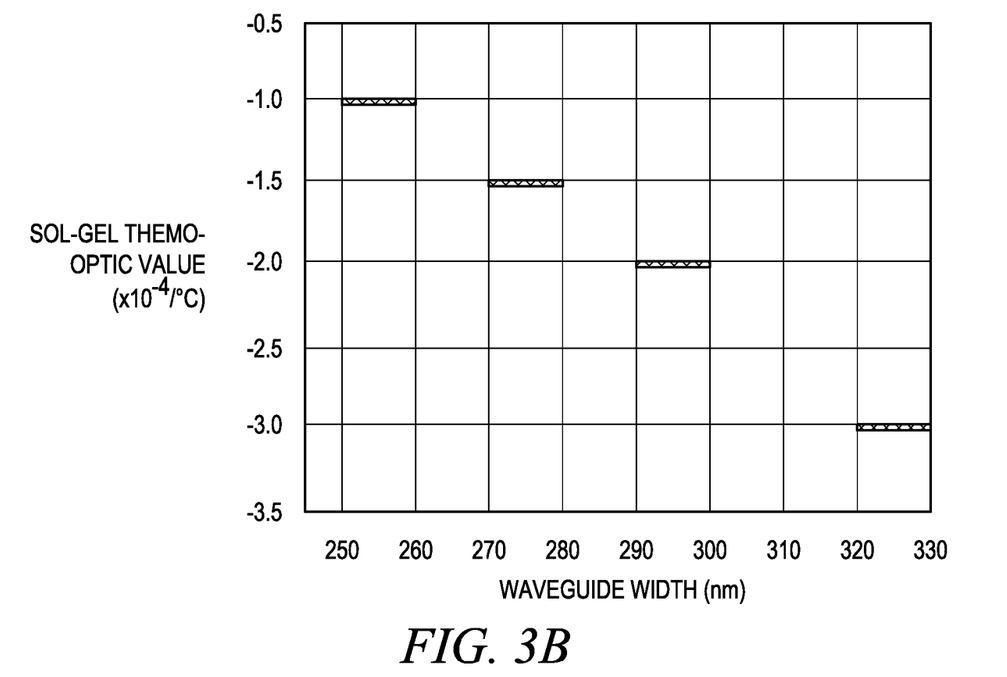
FIG. 3(b) is a plot of the thermo-optical coefficients required to achieve athermality for waveguide widths from 260 nm with a core thickness of 220 nm.

A range of possible TOC values have also been examined based on the values mentioned above for the available sol-gel materials and matching geometrical conditions that would athermalize the waveguides. For this purpose the refractive index of the measured 95/5 sol-gel was used. It was found that as the waveguide widths increase from 260 nm to 325 nm claddings were needed that have larger magnitude TOCs to achieve athermal rings. These results, plotted in FIG. 3(b), are in line with expectations that as the waveguide width increases, the amount of light confined in the silicon core increases. Thus, a larger magnitude TOC for the cladding is needed in order to obtain a negative effective TOC to cancel the combined effects of the silicon's TOC and thermal expansion.

Device Fabrication

Figure 4A:
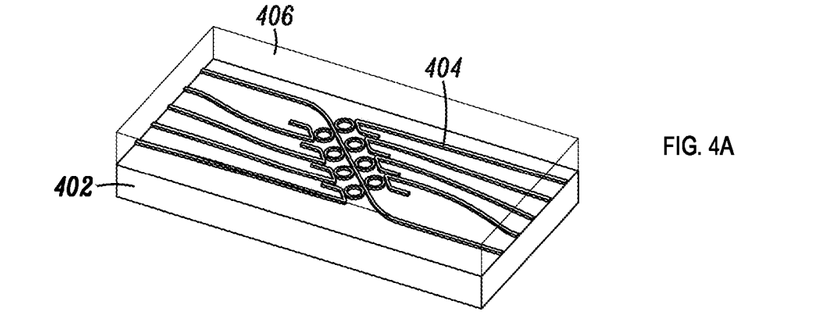
FIG. 4(a) shows an OADM chip that includes an $SiO_2$ wafer, patterned waveguide cores that define the OADM, and a top cladding layer.
Figure 4B:
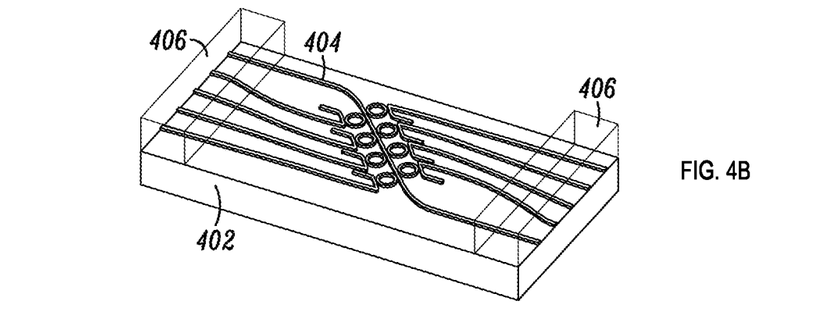
FIG. 4(b) shows the OADM chip after removal of the top cladding layer in a wet etching process.
Figure 4C:
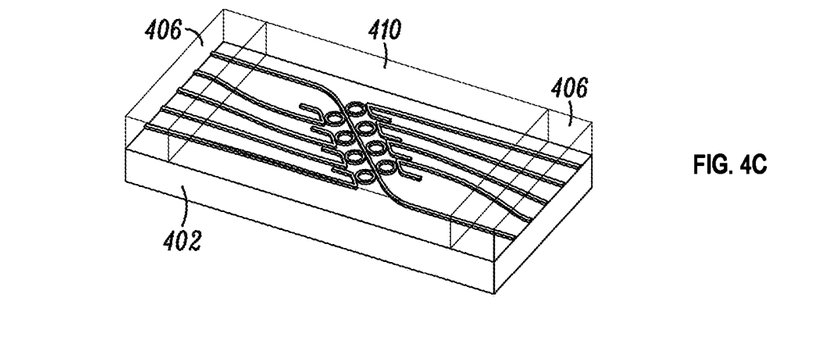
FIG. 4(c) shows a 95/5 sol-gel layer that was spin-coated on the OADM chip after removal of the top cladding layer.
Figure 4D:
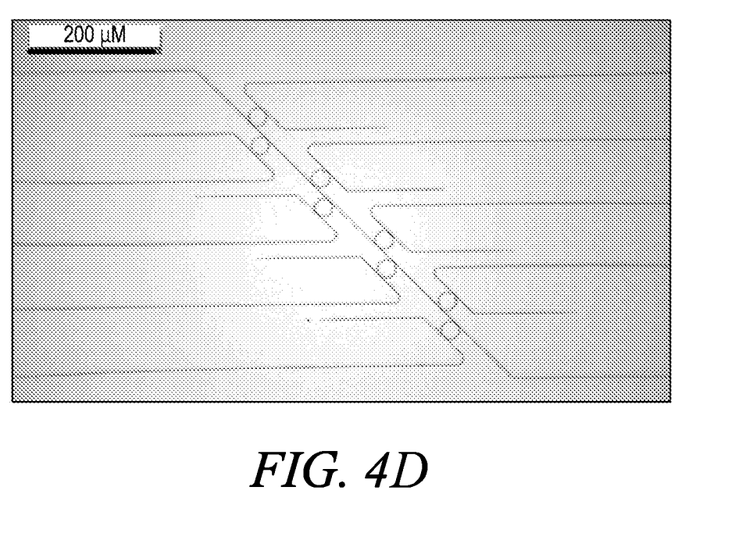
FIG. 4(d) is a microscope image of the fabricated OADM chip.

FIG. 4(d) shows a microscope image of fabricated OADM silicon waveguides using the design shown in FIG. 2(a). The silicon photonics fabrication process began with an SOI wafer having a 3 µm bottom oxide layer. Silicon waveguide cores were patterned by photolithography and dry etching. The waveguide thicknesses were nominally 230 nm. Subsequently, silicon dioxide was deposited on the structures through plasma enhanced chemical vapor deposition (PECVD) up to 1.5 µm. The sol-gel materials were prepared as follows. In a glass vial with 10 g of methacryloxypropy-ltrimethoxysilane (MAPTMS, Gelest) and 0.64 g of 0.1 M HCl a mixture of 0.96 g of zirconium propoxide (60% in 1-propanol, Aldrich) and 0.16 g of methacrylic acid (99% Aldrich) are added while stirring. The reaction mixture was stirred for 5 days before spin coating.

Figure 4E:
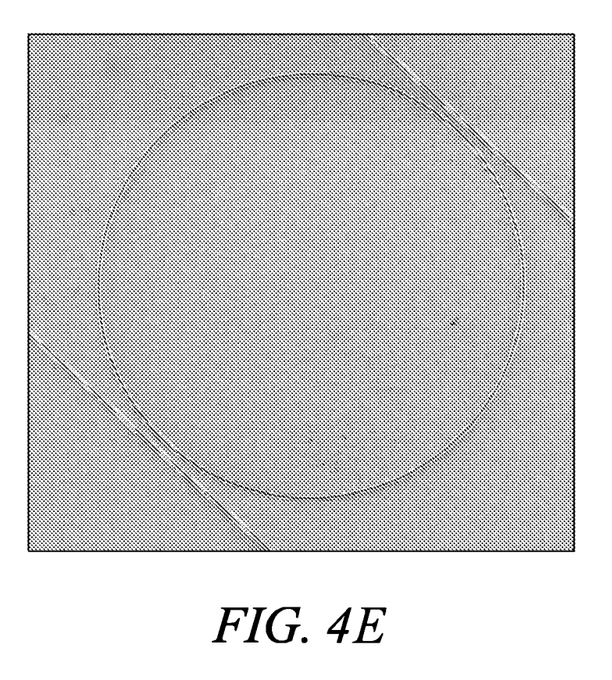
FIG. 4(e) is an SEM image of one ring after etching the top cladding layer.
Figure 4F:
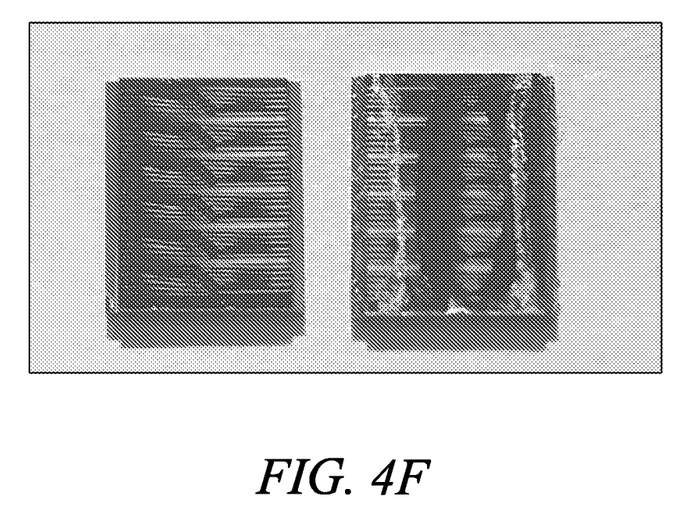
FIG. 4(f) shows an image of the actual OADM chip before etching (left) and after the deposition of sol-gel (right).

After performing the primary OADM silicon waveguide chip fabrication, the silica material of the top cladding is replaced with the sol-gel material to achieve athermal operation. The fabrication process for replacing the top cladding layer is shown in FIG. 4(a), which shows the $SiO_2$ wafer 402, the patterned waveguide cores 404 and the top cladding layer 406. First, as shown in FIG. 4(b), the silica top layer 406 was removed in a wet etching process using buffered oxide etchant (Transene, 6:1 H2O: BOE). To preserve the coupling end faces of the chips and to avoid damage caused by wet etching, the end faces were covered with Kapton tape as a mask. Next, the intended oxide opening was verified by imaging the chips through a scanning electron microscope (SEM). As shown in FIG. 4(c), after this opening process, the 95/5 sol-gel 410 was spin-coated on the trench defined between the remaining portions of the silica top layer 406 at 3000 rpm for 40 s after a 2 min oxygen plasma surface treatment. The trench was completely covered, which indicated that the sol-gel layer was more than 1.5 µm thick. The resulting OADM chips were thermally cured to complete the fabrication process. FIG. 4(e) shows an SEM image of one ring after etching the top cladding layer. FIG. 4(f) shows an image of an actual OADM chip before etching (left) and after the deposition of sol-gel (right).

In order to analyze the effect of 95/5 sol-gel's thermal curing time and curing temperature on the microring temperature dependence, the curing was performed at 130° C. and 150° C. for 10.5 h, 11 h, and 12 h.

Measurement Setup

Figure 5:
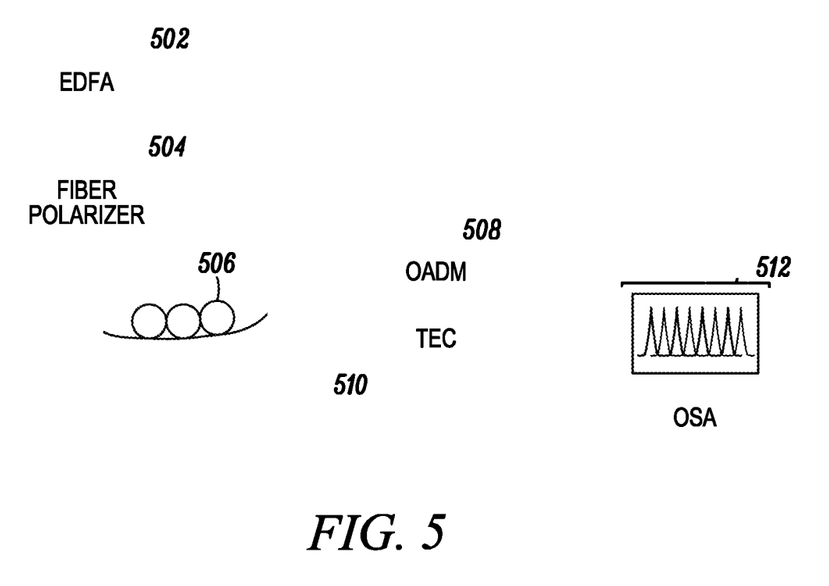
FIG. 5 shows an arrangement for characterizing the spectral temperature dependence of the fabricated OADM device.

The spectral temperature dependence of the fabricated OADM device was characterized using the arrangement 500 shown in FIG. 5. The broadband amplified spontaneous emission of an erbium doped fiber amplifier (EDFA) source (PriTel, FA-18) 502 was used. The emission had a spectrum ranging from 1520 nm to 1570 nm. The EDFA source 502 was connected to an inline fiber polarizer 504 and a polarization controller 506. Light from the fiber was coupled into the input waveguide of the OADM chip 508 and collected from the drop ports, which are shown in FIG. 2(a).

Ultra-high NA fibers (UHNA-7, Nufern Inc., NA=0.410 with a mode field diameter 3.2±0.3 µm at 1550 nm) that were spliced to SMF-28 fiber were used in order to increase fiber-waveguide coupling efficiency. The OADM chip 508 under test is located on a temperature controlled stage that employed a thermo-electric cooler (TEC) 510 and a semiconductor temperature sensor (not shown). Finally, the light from the OADM 508 entered an optical spectrum analyzer (OSA) (Yokogawa Electric Co., AQ6730B) 512 in order to observe the spectrum at a 0.05 nm resolution. The measurement procedure was automated in LabVIEW to control the instruments for collecting spectral data at a wide range of temperatures for the individual drop ports of the OADM chips.

Experimental Results

Figure 6A:
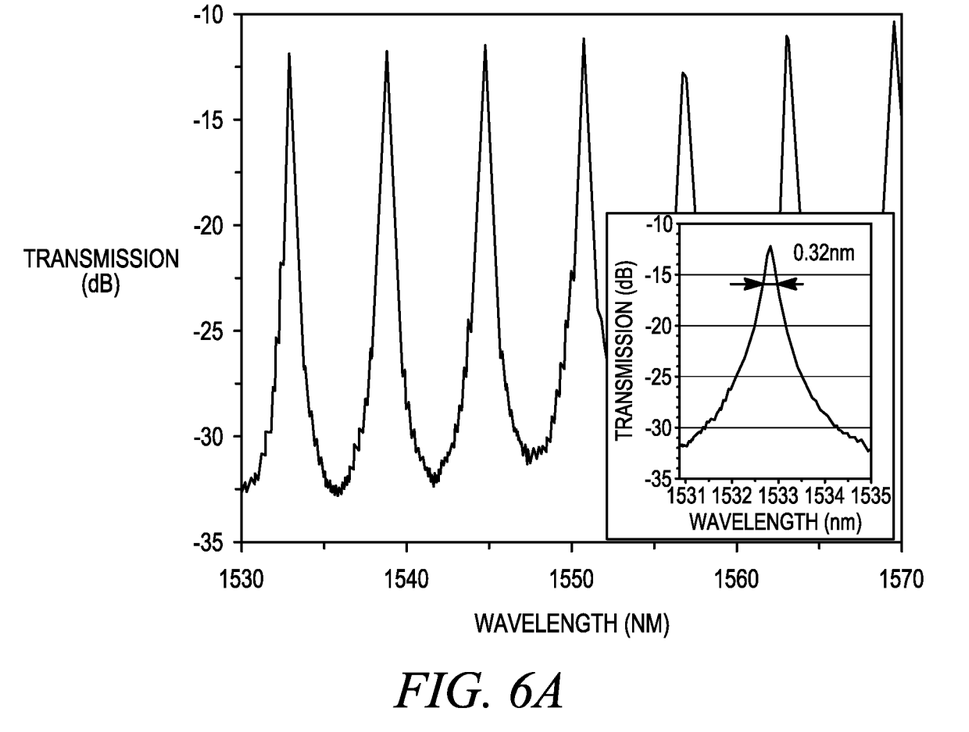
FIG. 6(a) shows a typical transmission spectrum from the first drop port of a sol-gel cladded OADM chip with a 325 nm waveguide width and a 500 nm gap.

The transmission of the OADM devices was measured after the OADM chips were prepared. A typical transmission spectrum from the first drop of a sol-gel cladded chip with 325 nm waveguide width and 500 nm gap is shown in FIG. 6(a). The resonances have a 6 nm FSR with 3 dB bandwidths that vary from 0.3 nm to 0.6 nm throughout the C band. The measured total Q factor of the sol-gel cladded rings yielded 2000-3700 for 300 nm width rings and varied from 3000-4700 for the wider 325 nm rings shown in the inset of FIG. 6(a). The increase in Q factor is because of the lower losses of the wider 325 nm silicon waveguides compared to silicon waveguides with a width of 300 nm.

Figure 6B:
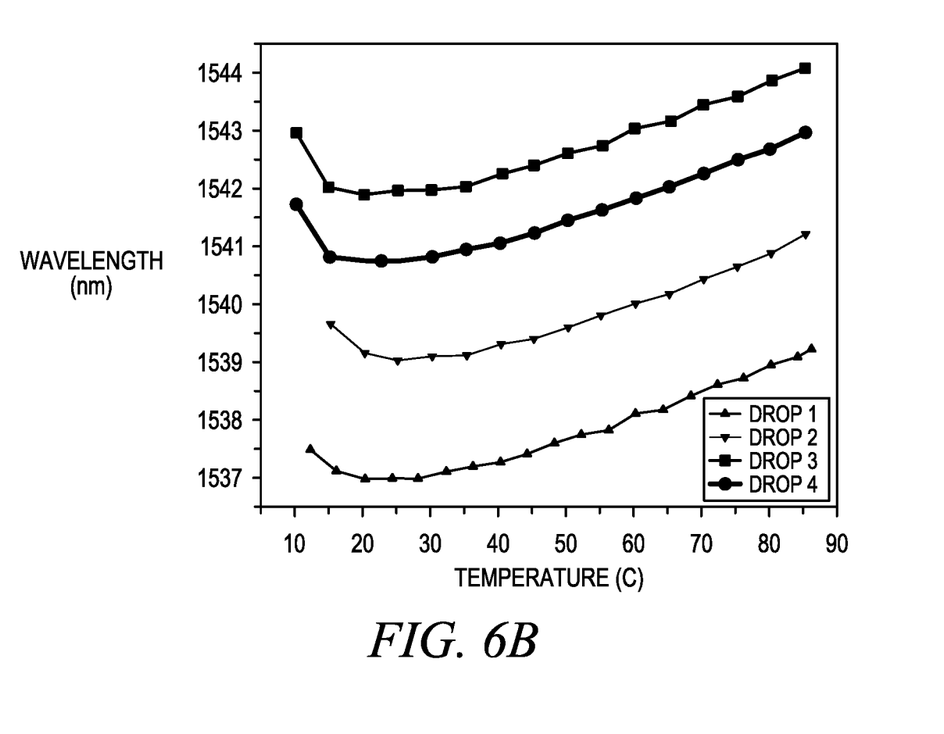
FIG. 6(b) shows the temperature dependent wavelength shifts for different drop ports of a sol-gel cladded OADM that has been cured for 12 hours for a 300 nm ring waveguide.

In order to examine the thermal performance of the OADM device, the thermally dependent behavior at the output port and the different drop ports were examined. The thermal dependence of the different drops shown in FIG. 6(b) demonstrates similar trends and very small differences in the thermal shift. The results shown are for an OADM with 300 nm wide ring waveguides. The temperature dependent wavelength shift shows a nonlinear behavior especially for temperatures below 35° C. Theoretically, the thermal shifts should not differ since the ring diameters differ by less than a micrometer. Nevertheless, the wavelength dependence of the thermal shift can account for minor differences.

Figure 7A:
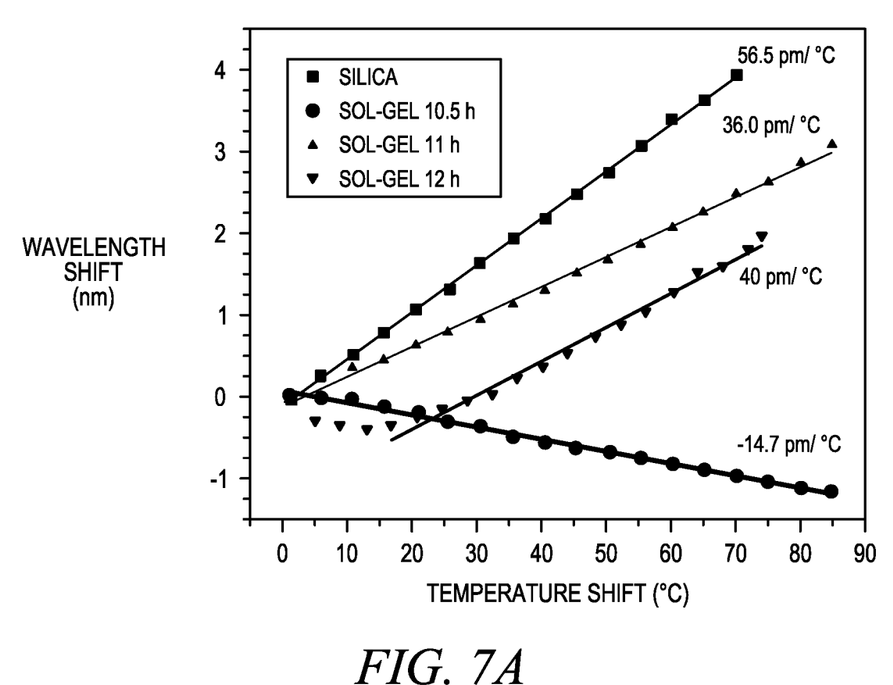
FIGS. 7(a) and 7(b) show the temperature dependent wavelength shifts for ring waveguides widths of 310 nm and 325 nm, respectively, with silica and sol-gel claddings cured at 130° C. for different times.
Figure 7B:
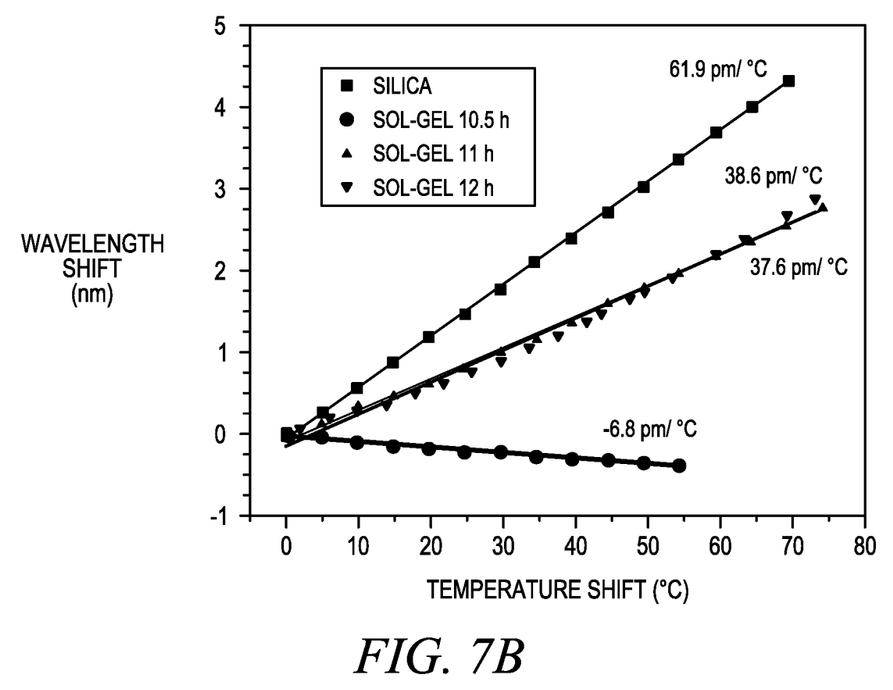

The temperature dependent behavior of sol-gel cladded rings was improved compared to their original silica cladded ones. The thermal shifts obtained in all sol-gel devices—regardless of geometrical and curing parameters—showed lower values compared to silica. To understand the effect of sol-gel curing time on thermal dependent wavelength shifts, FIGS. 7(a) and 7(b) show the relative shifts for the resonance wavelengths with respect to temperature changes for ring waveguide widths of 310 nm and 325 nm, respectively, cured at 130° C. The thermal shift for a similar ring covered with silica is also plotted to compare with the sol-gel's performance. For the 325 nm wide ring, slopes for 10.5 h, 11 h and 12 h cure time were −6.8 pm/° C., 37.6 pm/° C. and 38.6 pm/° C., respectively, as shown in FIG. 7(b). It was observed that as the curing time increases, the thermal shift increases as well. In particular, the slope changes sign while the sol-gel is cured between 10.5 h (negative slope) to 11 h (positive slope). When the sol-gel is cured beyond 11 h, the slope does not change as rapidly as before and for the 12 h cured sol-gel the slope values agree well with the simulation results.

Similar observations were also made for OADM chips with smaller ring waveguide widths (300 nm and 310 nm) cured at 130° C. and also for chips cured at 150° C. The results for the 310 nm ring waveguide width in FIG. 7(a) shows that the resonance peak shifts varied from −14.7 pm/° C. to 40 pm/° C. Comparing the geometrical factors shows that an increase in waveguide width raises the thermal shift for the same curing parameters. This is consistent with models, simulations results, and previous reports.

Figure 8A:
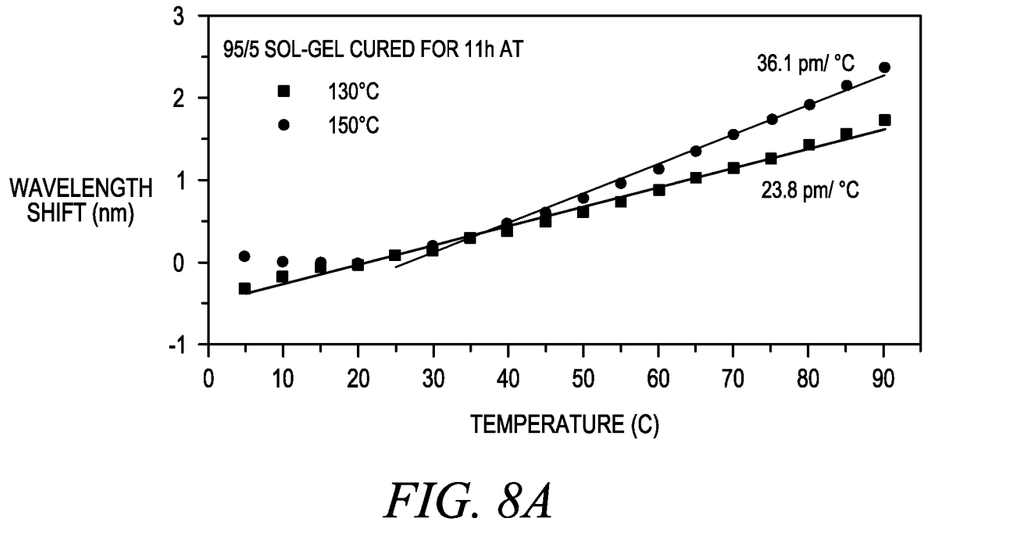
FIGS. 8(a) and 8(b) show the wavelength shift for an OADM with a ring width of 300 nm cured at 130° C. and 150° C. for a curing time of 11 h (FIG. 8(a)) and 10.5 h (FIG. 8(b)).
Figure 8B:
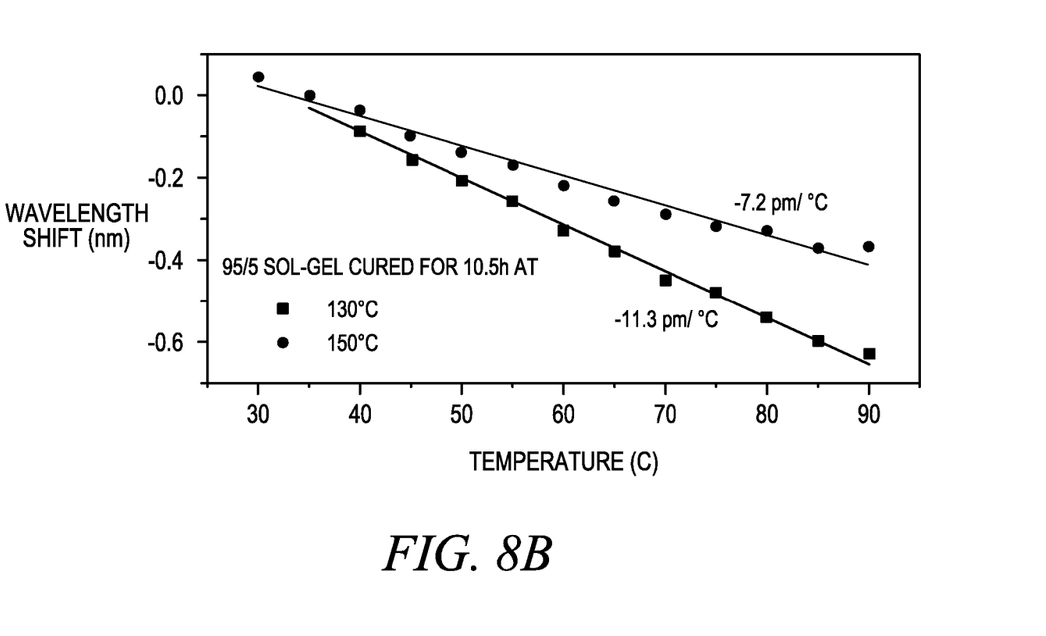

Sol-gel devices cured with equal curing times but at higher temperature show an increase in thermal dependence for similar rings. FIGS. 8(a) and 8(b) show the wavelength shift for an OADM with a ring width of 300 nm cured at 130° C. and 150° C. for a curing time of 11 h (FIG. 8(a)) and 10.5 h (FIG. 8(b)). Even though a thermal shift of −6 pm/° C. was obtained for a 325 nm ring cured at 130° C., a thermal shift of −7 pm/° C. was obtained for rings with 310 nm width cured at 150° C.

Figure 9:
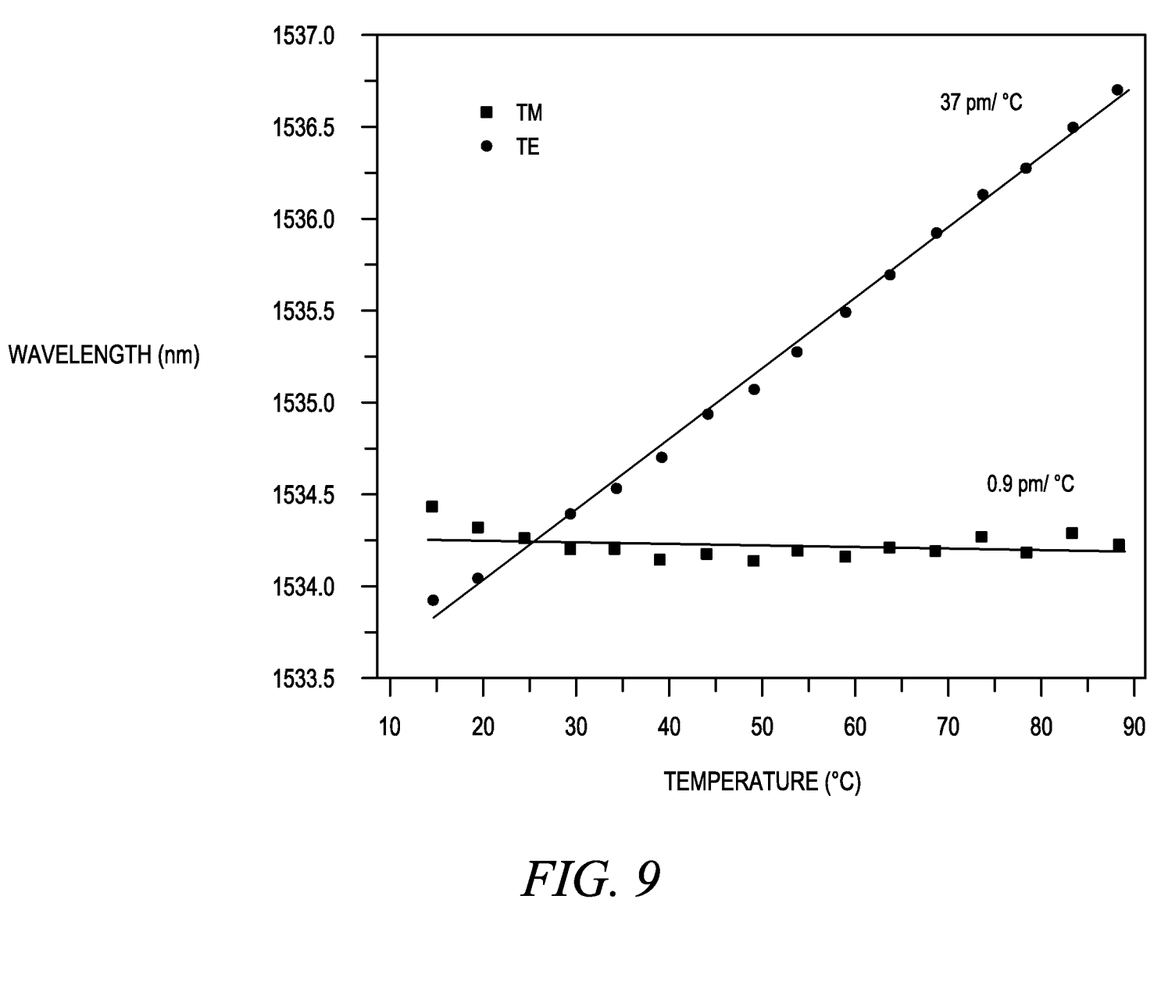
FIG. 9 shows the polarization dependence of the temperature dependent wavelength shift for an OADM having a 310 nm ring width and a 500 nm gap cured at 130° C. for 11 h.

Although these OADM devices were designed to operate only at TE polarization, as shown in FIG. 9, when sol-gel was cured for 11 h, the thermal shifts for TM polarization were found to be lower than −0.9 pm/° C., reaching the ultimate desired athermal condition. The reason for this large difference in thermal shifts is that since Si waveguides are birefringent due to their rectangular shape, the effective indices and their optical confinement in the sol-gel cladding are different for TE and TM modes. TM modes have more optical confinement in the sol-gel cladding compared to TE modes and therefore it is easier to achieve a lower thermal wavelength shift.

The polarization dependence in the data arises because the waveguides are not polarization independent. Silicon photonic waveguides typically have widths between 300 nm to 500 nm and thicknesses between 220 nm up to 260 nm. This rectangular waveguide shape causes an effective index difference between the two polarizations which results in polarization dependent effects.

The cause for the nonlinearity at temperatures below 25° C. was later found to be due to water condensation on the sol-gel layer after the chip was cooled down. It is well known that silica based sol-gel materials adsorb water and humidity, which eventually raises their refractive index. Therefore the wavelength shift at those temperatures was not due to a negative TOC.

The explanations for the influence of the curing parameters on the thermal wavelength shifts are related to the degree of condensation and the crosslinking density of the sol-gel material. The amount of condensation and cross-linking is controlled through curing time and curing temperature. This structural change in the material has an effect on the thermal expansion coefficient, which eventually correlates with its TOC. Therefore, this can manifest in a change in the thermal shift for the ring resonators.

To confirm this hypothesis, the IR spectra of 95/5 sol-gel films cured under the same conditions as the experimental devices were taken using an FTIR (Fourier transform infrared) spectrometer. The results showed that a longer curing time or a higher curing temperature resulted in a reduction in the number of C=C bonds, which indicates an increase in the degree of polymerization of the organic groups. Such similar structural modifications of the sol-gel material were also confirmed with previous reports conducted to study the effect of thermal and UV curing on organically modified silicates. Hence, an increase in polymerization reduces the CTE together with the TOC magnitude and the athermality, which agrees with the experimental results presented above.

In summary, an athermal ring resonator-based OADM has been designed and demonstrated through the use of organically modified sol-gel claddings. The sol-gel curing conditions—time and temperature—were examined in order to obtain athermal waveguides by modifying the thermo-optic coefficients. Curing time was found to be a major factor compared to curing temperature in order to obtain the desired thermal shifts. By controlling the 95/5 sol-gel's curing time, the thermal wavelength shift for devices with 325-nm wide rings were significantly reduced down to −6.8 pm/° C. in comparison with silica claddings (61.9 pm/° C.). Curing sol-gel at 150° C. with a 10.5 h curing time reduced the thermal shifts of OADMs with 310-nm rings to −7 pm/° C. Even though, these devices were not designed for TM operation, the temperature dependence at this polarization showed less change, with −0.9 pm/° C. achieved when the sol-gel was cured for 11 h at 130° C. The FTIR results demonstrate that the TOC of sol-gel can be adjusted by varying the thermal curing conditions. Moreover, the tunable TOC of the sol-gel provides a key lever for achieving athermality for various waveguide structures without changing the cladding material. All the features mentioned above make sol-gel a viable material for the manufacturing of athermal devices in silicon photonics.

While exemplary embodiments and particular applications of this invention have been shown and described, it is apparent that many other modifications and applications of this invention are possible without departing from the inventive concepts herein disclosed.

The invention claimed is:

1. A method of forming an optical waveguide structure, comprising:
    forming a lower cladding layer on a substrate;
    forming a waveguiding core layer on the lower cladding layer;
    applying as an upper cladding layer on the waveguiding core layer and the lower cladding layer a sol-gel material, the sol-gel material including an organically modified siloxane and a metal oxide;
    adjusting a thermo-optic coefficient of the sol-gel material by curing the sol-gel material for a selected duration of time at a selected temperature such that the thermo-optic coefficient of the sol-gel material compensates for a thermo-optic coefficient of at least the waveguiding core layer such that an effective thermo-optic coefficient of the optical waveguide structure at a specified optical wavelength and over a specified temperature range is zero.

2. The method of claim 1, wherein the substrate is a silicon-on-insulator (SOI) substrate.

3. The method of claim 1, wherein the sol-gel material includes an organically modified siloxane and a metal oxide.

4. The method of claim 3, wherein the organically modified siloxane includes MAPTMS.

5. The method of claim 3, wherein the metal oxide includes zirconium propoxide.

6. The method of claim 3, wherein the metal oxide includes titanium propoxide.

7. The method of claim 3, wherein the metal oxide includes iron propoxide.

8. The method of claim 1, wherein curing the sol-gel material further comprises thermally curing the sol-gel material.

9. The method of claim 1, wherein curing the sol-gel material further comprises curing the sol-gel material by application of UV or microwave radiation.

10. An optical waveguide circuit formed in accordance with the method of claim 1.

11. A method of forming an optical waveguide structure, comprising:
    forming a lower cladding layer on a substrate;
    forming a waveguiding core layer on the lower cladding layer;
    applying as an upper cladding layer on the waveguiding core layer and the lower cladding layer a sol-gel material, the sol-gel material including an organically modified siloxane and a metal oxide;
    selecting one or more curing parameters used to cure the sol-gel material such that after curing the optical waveguide structure exhibits reduced thermal dependent wavelength shifts at a specified optical wavelength over a specified temperature range relative to a silica cladded optical waveguide structure; and
    curing the sol-gel material in accordance with the selected one or more curing parameters.

12. The method of claim 11, wherein selecting the one or more curing parameters includes selecting the one or more curing parameters such that the thermal dependent wavelength shifts are minimized at the specified optical wavelength over the specified temperature range.

13. A method of forming an optical waveguide circuit, comprising:
- forming on a substrate a waveguide structure defining the optical waveguide circuit;
- applying as an upper cladding layer on the waveguide structure a sol-gel material that includes an organically modified siloxane and a metal oxide;
- selecting one or more curing parameters used to cure the sol-gel material such that the thermo-optic coefficient of the sol-gel material after curing compensates for a thermo-optic coefficient of the waveguide structure so that an effective thermo-optic coefficient of the optical waveguide circuit at a specified optical wavelength is zero over a specified temperature range; and
- curing the sol-gel material in accordance with the selected one or more curing parameters.

14. The method of claim 13, wherein the optical waveguide circuit includes a ring resonator.

15. The method of claim 13, wherein the optical waveguide circuit is selected from the group consisting of a Mach-Zehnder interferometer and an arrayed waveguide grating.

16. The method of claim 13, wherein the substrate is a silicon-on-insulator (SOI) substrate.

17. The method of claim 14, wherein the curing parameters being adjusted include curing time and/or curing temperature.

18. The method of claim 13, wherein the organically modified siloxane includes MAPTMS.

19. The method of claim 13, wherein the metal oxide includes zirconium propoxide.

20. The method of claim 13, wherein the metal oxide includes titanium propoxide.

21. The method of claim 13, wherein the metal oxide includes iron propoxide.

22. The method of claim 13, wherein curing the sol-gel material further comprises thermally curing the sol-gel material.

23. The method of claim 13, wherein curing the sol-gel material further comprises curing the sol-gel material by application of UV or microwave radiation.

* * * * *